United States Patent
Wilson

(10) Patent No.: US 7,736,718 B2
(45) Date of Patent: Jun. 15, 2010

(54) COMPACT NO-TURN ATHLETIC EQUINE BOOT, LAMINATE AND METHOD

(75) Inventor: Robby Wayne Wilson, Del Rio, TX (US)

(73) Assignee: Equibrand Products Group LP, Granbury, TX (US)

( * ) Notice: Subject to any disclaimer, the term of this patent is extended or adjusted under 35 U.S.C. 154(b) by 0 days.

(21) Appl. No.: 12/283,122

(22) Filed: Sep. 9, 2008

(65) Prior Publication Data

US 2009/0061162 A1  Mar. 5, 2009

Related U.S. Application Data

(62) Division of application No. 11/544,359, filed on Oct. 6, 2006, now Pat. No. 7,434,378.

(51) Int. Cl.
*B32B 3/00* (2006.01)
*B32B 37/14* (2006.01)

(52) U.S. Cl. .......... 428/156; 428/158; 428/159; 428/160; 428/170; 428/316.6; 442/394; 156/60

(58) Field of Classification Search ............... 428/156, 428/158, 159, 160, 170, 316.6; 442/394; 156/60

See application file for complete search history.

(56) References Cited

U.S. PATENT DOCUMENTS

| | | | |
|---|---|---|---|
| 162,052 A | 4/1875 | Gilbert | 168/25 |
| 167,895 A | 9/1875 | Hall | 168/2 |
| 2,483,065 A | 9/1949 | Swartz Edwards et al. | 54/82 |
| 2,886,935 A | 5/1959 | Shelton | 54/71 |
| 3,248,853 A | 5/1966 | Code et al. | 54/82 |
| 3,703,209 A | 11/1972 | Glass | 168/18 |
| 4,470,466 A | 9/1984 | Nakanishi | 168/18 |
| 4,503,914 A | 3/1985 | Voland | 168/18 |
| 4,513,825 A * | 4/1985 | Murphy | 168/12 |
| 4,548,026 A | 10/1985 | Shidner | 54/82 |
| RE32,930 E | 5/1989 | Westropp | 54/82 |
| 4,981,010 A | 1/1991 | Orza et al. | 54/82 |
| 6,192,989 B1 | 2/2001 | Tooman | 168/1 |
| 6,662,537 B1 | 12/2003 | Wilson | 54/82 |

* cited by examiner

*Primary Examiner*—Norca L Torres-Velazquez
(74) *Attorney, Agent, or Firm*—John H. Miller

(57) ABSTRACT

A laminate comprising a tough, flexible, hard layer and a cushion layer for uses such as in making a compact, athletic equine boot that resists turning on the animal's hoof when the animal such as a horse is jumping, running and turning in water, mud, sand and sawdust comprising a bell portion having a cushiony layer on the interior of a relatively rigid or hard shell, an internal compressible protrusion, a fastener to secure the boot on the hoof, the hard shell being flexible and strong to resist blows from over-reaching rear hooves. The invention also includes a method of making the laminate comprising a layer of a tough, flexible, strong material and a cushiony layer.

20 Claims, 3 Drawing Sheets

COMPACT NO-TURN ATHLETIC EQUINE BOOT, LAMINATE AND METHOD

This application is a division of application Ser. No. 11/544,359, filed Oct. 6, 2006, now U.S. Pat. No. 7,434,378 issued Oct. 14, 2008.

The present invention involves a compact equine boot for protecting the hoofs of horses during vigorous activity, particularly in water, sand and mud, a laminate used to make the boot and a method of making the laminate.

BACKGROUND

Boots to prevent injury to the back of horses front pastern bones and hoofs when running and doing hard maneuvers, such as in various competitions like jumping, barrel racing, roping, cutting, etc. are known, and it is also known to form a protrusion on the inside of the boot that fits into the depression in the back of each front hoof to hold the boot in place and to prevent turning. It is known to make equine boots by sandwiching a foam layer between exposed layers of cloth as shown in U.S. Pat. No. 4,548,026. It is also known to make the boots using a series of vertical panels as is disclosed in U.S. Pat. No. Re 32,930. It is also known to use different types of fasteners such as that shown in these and other patents, including Velcro® straps, leather straps with various kinds of buckles, laces and cleats, etc. Boots like the one described in this last named patent did not function satisfactorily as explained in column 1 of U.S. Pat. No. 4,548,026 previously cited above.

A typical prior art boot is constructed of a foam core, covered on the inside with a soft fabric and on the outside with a nylon fabric. A raised generally triangular protrusion exists in the center portion of the top inside of the boot for fitting at the back of a horse's front hoof. A scuff pad is attached on the exterior of that portion of the boot covering the back of the hoof. The prior art boot is separated generally in the center of the front of the hoof and is continuous around the rest of the hoof. The boot is secured in place with a Velcro® fastener. This boot works well in good conditions, but can be pushed upward when the horse is maneuvering vigorously in mud, water and/or sand exposing the vulnerable rear portion of the front hoofs.

The rear of the boot is often made of a tough, but cushiony material, which, under good conditions, protects the vulnerable rear area behind the horse's front hooves. However, although there are many different kinds of boots to protect horses' front hoofs, all suffer a characteristic that still allows injury in certain conditions. Those conditions are water, sand, sawdust and mud. When the horse is running in or jumping into several inches of water, mud, sawdust or sand, the water, mud, sawdust or sand pushes the boot upward exposing the vulnerable area behind the front hoof, allowing the boot to turn and allowing the front of the rear hoof to strike the vulnerable area injuring the rear portion of the horse's coronet and/or pastern and/or the bulb of the heel of the hoof.

It is known from U.S. Pat. No. 6,662,537 to attach a bell portion extending above the tops of prior art height boots to prevent the boot from moving up the horses leg, leaving the vulnerable portions unexposed. This boot works good, but some prefer a shorter and more compact boot. A more compact boot that will not turn even in mud, water or sand is therefore very desirable and meets a long felt need.

SUMMARY OF THE INVENTION

The invention comprises a compact equine no-turn boot comprising a bell portion for covering a major portion of a hoof and a fastener for securing the no-turn boot to the hoof. The bell portion of the compact no-turn boot comprises a novel, relatively rigid member, or a hard shell, having a shape that fits closely and tightly to the hoof and prevents the compact boot from rotating or moving upward on hoof or leg. The relatively rigid member or shell is the improvement and comprises a tough material layer that is somewhat flexible, but relatively rigid and shaped to fit securely to a horse's front hoof. By shaped to fit securely is meant that the combination of the magnitude of rigidity of the layer and its close fit to the hoof prevents the boot from being pushed upward and/or rotated on the hoof while the horse is running, turning or stopping vigorously.

The compact equine boot bell also comprises a cushion layer, usually on the inside the relatively rigid member, but it can also be on the outside of the hard shell, and also optionally a tough, cloth layer or lining as an exposed inside surface of the compact no-turn boot. Also optionally, the compact no-turn boot can also have a tough outer cover that can also be decorative if desired. The tough, inside cloth lining can be rolled over the top and/or bottom of the compact no-turn boot and attached to the outer cover and/or the relatively rigid member or hard shell by any suitable means, but most typically by stitching.

The tough, relatively rigid member or hard shell is most typically molded to retain a shape that fits closely to the front hoofs of the horse, having sides curved towards an open front and a rear surface comprising a lower portion that gently curves from one side to the other side and an upper portion that is fairly flat and sloping towards the open top of the compact no-turn boot. The tough, relatively rigid member or hard shell is more typically made from an elastomeric organic or polymer material having a Shore A hardness, of about 80 to about 93 (as measured with the A probe in the ASTM D2240 test). Other properties most typically desired are a tensile strength of at least about 45 N/cubic millimeter, more typically at least about 50, a tear strength of at least 50 N/mm, more typically at least 60 N/mm and most typically at least about 70 N/mm, good abrasion resistance and, most typically, a deflection ratio at 70 degrees C. of about 35 to about 45 although this latter property is not essential to the invention.

Polymer materials that can meet this hardness and flexibility requirement include epoxies, fluoropolymers, polyamides, polycarbonates, polyesters, polyethylene, polyolefins, polypropylene, polyvinyl chlorides, silicones, styrene acrylonitriles, thermoplastic elastomers and polyurethanes and organic materials include rubber and leathers including cowhide and leathers having similar properties.

Most typically, the hard shell is made from a polyester type polyurethane polymer having a Shore A hardness of about 85+/−4. The rear surface of the compact no-turn boot is sometimes called the scuff portion as it is this part that is occasionally struck by the horse's rear hoofs. Not necessarily, but most typically, the hard shell is thicker in the scuff portion than in less critical portions of the hard shell. The strength properties and hardness property of the hard shell are also important in the boot of the invention to prevent damage to the vulnerable portions of the rear side of the front hooves. When used in cold weather, the resistance to low temperatures of the hard shell is also important. Optionally, the relatively rigid or hard shell can have a cover of film or fabric and this film or fabric can be an attractive color with or without a design contained in or on the film or fabric.

A further option can be a strip of very tough, textile material, more typically a woven textile, rolled over the bottom edge and attached to the cloth lining and either the outer cover or the relatively rigid member, most typically attached to all four layers including the cushion layer by one or more rows of stitching, more typically near the bottom edge of the compact no-turn boot. By "near" the bottom or top edge of the compact no-turn boot is meant within about 0.75 inch of the top or bottom edge, more typically within about 0.5 inch and most typically within about 0.38 inch.

Finally, the compact no-turn boot comprises a fastener. The fastener is any conventional fastener that is reliable, easy to secure or undo quickly, and is safe for the horse and person installing the boots. The fastener is usually on the front of the compact no-turn boot, but can be in other locations such as on the side of the bell portion. The fastener is preferably a Velcro® type fastener, but other types of fasteners can be used such as a strap having holes and a buckle, a strap and a no-slip slotted buckle, laces and eyes or cleats etc.

The can be of a round shape, but preferably is relatively flat or generally straight across the back in the scuff portion. The fastener is preferably located to be on the outside of the horses hoof and in or near the front making it easier to fasten, being out of the way of the other front hoof and more accessible for securing the boot on the horse's hoof. The compact no-turn boot also preferably comprises a raised portion on the inside of the bell portion adjacent or near the upper edge of the bell portion and inside the relatively rigid member and shaped to fit between the two bulbs of the horse's heel of the hoof.

The invention also comprises a laminate comprising a layer of tough, relatively flexible material having a Shore A hardness of about 80 to about 90, a layer of cushiony material next to the tough, relatively flexible layer and a layer of strong fabric covering the cushiony material, the layers being secured together with an adhesive or by stitching or both. Optionally, the laminate can comprise a fourth layer of tough, dense film or fabric next to the other surface of the tough, relatively flexible material. Also optionally, the laminate can have a binding on one or more edges, the binding being either the layer of strong fabric or a separate layer of very strong woven fabric. Finally, the laminate can have one or more fasteners attached near an edge of the laminate for the purpose of fastening one edge of the laminate to another edge of the same laminate or a second laminate—the fastened edges can be together or spaced apart by up to one inch. Any type of fastener is suitable, but most typically is a Velcro® type fastener.

The invention also comprises a method of making the above laminate and no-turn boot comprising attaching a layer of wall material to an inner covering material and a cushion layer, such as a layer of foam material, forming the laminate and a shape that resembles a portion of a bell, but having a top opening and a bottom opening and a vertical slit or slot opening formed by the two ends of the wall of the boot, and attaching a fastener to the walls of the bell shaped laminate on either side of each end of the laminate, the improvement comprising using as the layer of wall material a relatively rigid layer as described above, and then shaping or molding the relatively rigid or hard layer into a shell to fit fairly closely to a front hoof of an equine. Optionally, the method can also include adding a cover to the outside of the relatively rigid layer including a decorative material.

The tough, inside cloth lining can be rolled over the top and/or bottom of the compact no-turn boot and attached to the outer cover and/or the relatively rigid member by any suitable means, but most typically by stitching. Also, a further option can be adding a strip of very tough, textile material, more typically a woven textile, and rolling the strip of the very strong textile over the bottom edge and attach the portions of the strip laying against the laminated wall of the boot to the cloth lining and either the outer cover or the relatively rigid member, most typically attach to all four layers including the cushion layer together by one or more rows of stitching, more typically near the bottom edge of the compact no-turn boot, and the same, except most typically using only one row of stitching, near the top of the compact no-turn boot. By relatively rigid member is meant that that is described above for the compact no-turn boot of the invention.

When the words equine and horse are used they are meant to include all animals resembling a horse and having hooves similar in shape as a horse even though smaller. Thus, such words would include horses of all types, mules, ponies of all types, zebras, etc.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION OF THE INVENTION

Figure 1:
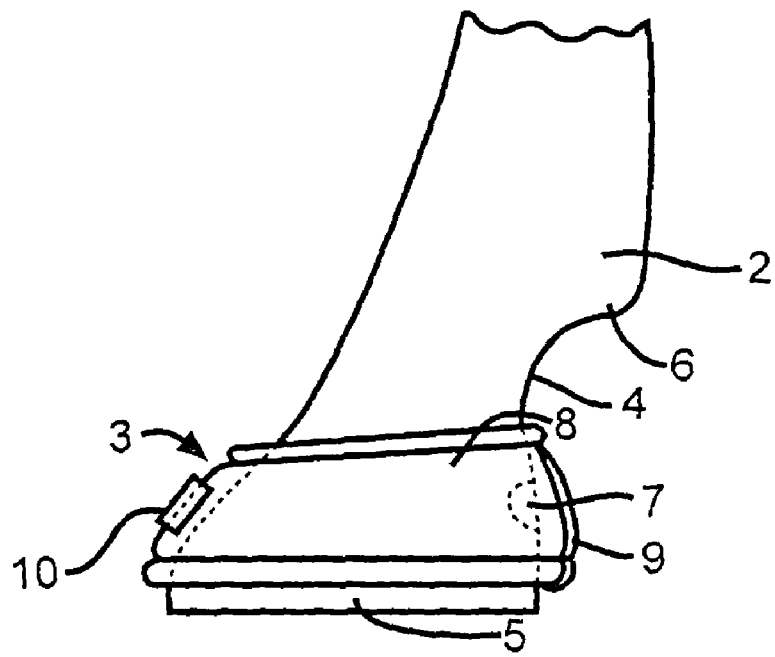
FIG. 1 shows the lower portion of a horse's left front leg and hoof with a boot of the invention covering most of the hoof and the coronet.

FIG. 1 shows the lower portion of a horse's front leg 2 with a boot 3 of the invention shown covering much of the horse's hoof 5. When a horse is engaged in vigorous jumping, running, turning, stopping and accelerating the horse frequently over reaches with a hind leg causing the front of a rear hoof to strike the rear of a front hoof causing injury which can temporarily, or sometimes permanently, incapacitate or handicap the horse for vigorous activity. The boot 3 covers the front hoofs 5 to prevent such injuries. Prior art boots, some that may look like boot 3 on the exterior, however often are pushed up and sometimes turned when the horse is operating in sand, mud or water, exposing the vulnerable parts of the horse's front hoofs 5 to injury. The parts of the horse's hoof 5 vulnerable to incapacitating injury are the bulb of the heel of the hoof 5 (back of the hoof) and the coronet 8, the lowest part of the horse's pastern 4, particularly the rear part of the coronet which contains ligaments, tendons, arteries, veins, and nerve endings as partially shown in FIG. 1 of U.S. Pat. No. 3,703, 209.

Figure 2:
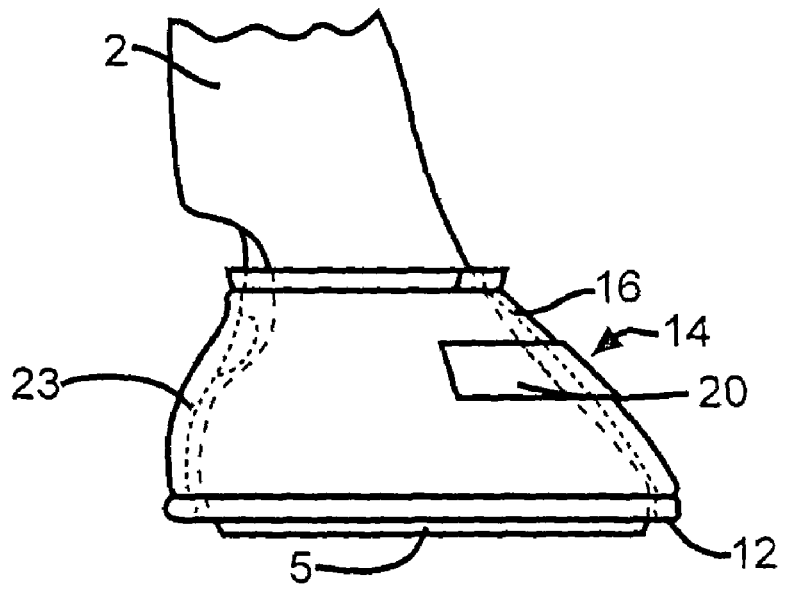
FIG. 2 shows the lower portion of a horse's right front leg and hoof having a preferred embodiment boot of the present invention covering the hoof and coronet.
Figure 5:
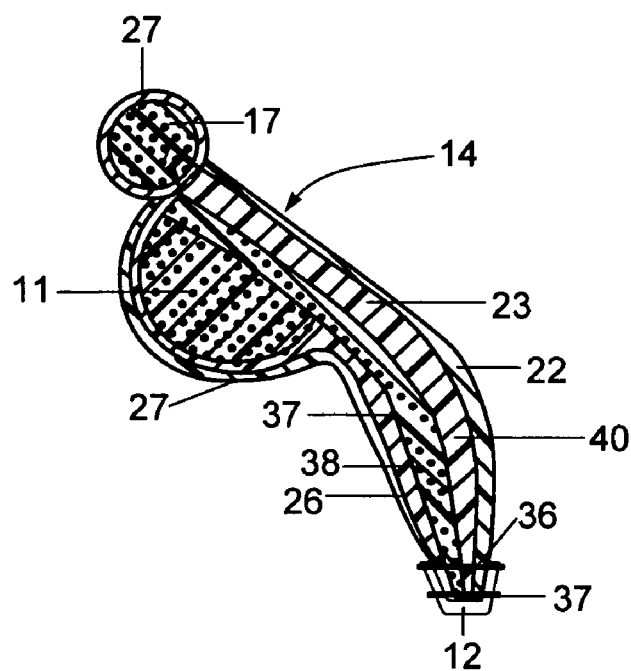
FIG. 5 is a cross section of the back part of the preferred boot shown in FIGS. 2-4 taken along lines 5-5 in FIG. 3.

The boot 14 shown in FIG. 2 is constructed of a tough, relatively flexible material layer or hard shell 23 (FIG. 5), a cushion layer 38 and a layer of strong, but soft fabric 26, and optionally a layer 22 on the outside or exterior of the hard shell 23 of a very strong, dense film or fabric, such as a nylon fabric. The optional exterior layer 22 can be decorative if desired. A raised generally triangular protrusion 7 of a relatively dense cushion or foam 11 exists in the center portion of the top inside of the boot 3 at a location that when fitted on the hoof 5 will be adjacent the back of the hoof 5. The boot 14 is separated generally in the center of the front of the hoof 5 and is continuous around the rest of the hoof 5. The boot 14 is secured in place with a Velcro® fastener 20. The combination of the raised generally triangular protrusion 7, the tough, relatively flexible material layer or hard shell 23 and the fastener 20 prevents the boot 14 from rotating on the hoof 5 and from moving upward on the horse's hoof 5 and leg 2 in all conditions.

The boot 3 has an optional cuff 18 on the top of the hard shell 23 that comprises an extension of the cushion material and covered by the strong, but soft fabric lining 26, rolled over and attached to the exterior surface of the hard shell 23, most typically by one or more stitches running parallel or near parallel to the top of the hard shell 23. The boot 3 can also have an optional lower cuff 12 that is an exposed layer of very strong, usually woven, fabric that begins near the lower edge of the hard shell 23, rolls over the lower edges of the hard shell 23 and cushion layer 38 and ends near the lower edge of the exterior of the hard shell 23. By near the lower edge of the hard shell 23 means a distance of from about 0.25 inch to about 0.75 inch from the lower edge of the hard shell 23, most typically about 0.5 inch. When an exterior layer of dense, very strong film or fabric 24 is used, the lower cuff 12 also can cover the lower edge of the dense, very strong film or fabric 24. The lower cuff 12 is secured to the hard shell 23, soft fabric lining 26 and optionally the exterior layer or cover 24 by an adhesive, rivets, or other fastening means, but most typically with one or more stitches of strong thread, such as two spaced apart stitches.

FIG. 2 shows a most typical embodiment of a boot 14 of the present invention on a horse's front leg 2 and around the hoof 5 and the pastern 4. The boot 14 includes a bell portion 16 for covering most of the hoof 5, an upper cuff 18, a lower cuff 12 and a closure or fastener 20 for fastening the boot 14 onto the hoof 5 in the front of the hoof 5. The bottom edge of the lower cuff 12 of the bell portion 16 is normally above the bottom of the hoof 5 when the boot 14 is in place on the horse, but can extend to the bottom edge of the hoof 5 if desired. When the boot of the present invention is fastened in place on the horse's hoof 5 and lower portion of the leg 2 of the horse, the upper cuff 18, being soft and flexible, fits snugly around the pastern 4. The cuff 18 preferably extends about 0.75 inch above the top of the bell portion 16 of the preferred boot 14, more preferably about ⅝ inch and most preferably about ⅞ inch above the top of the bell portion 16. The combination of the raised generally triangular protrusion 7, the tough, relatively flexible material layer or hard shell 23 and the fastener 10 prevents the boot 3 from rotating on the hoof 5 and from moving upward on the horse's hoof 5 and leg 2 in all conditions.

Many materials can be used for the hard shell so long as the Shore A hardness is in the range of about 80 to about 90, the material is flexible and tough enough to withstand strikes from a rear hoof without breaking and, for cold weather use, has a low temperature resistance to at least about minus 35 degrees C., most typically to at least about 40-50 degrees C. The material of the hard shell should have a Taber abrasion resistance of about 25+/−5 mg/1000 cycles (H-18 wheel; ASTM D-1044), high tear strength of at least about 50 about N/mm (ASTM D624) more typically at least about 60 and most typically at least about 70 N/mm, high tensile strength of at least about 6.9+/−2 MPa at 100% elongation (ASTM D-412), or at least about 55-60 N/mm to break, and excellent flexural strength of at least about 500% elongation at break, more typically at least about 600% and most typically at least about 650%.

Most typically, the hard shell is made from a polyester type polyurethane elastomer such as BASF's Elastollan® S85A available from BASF of Florham Park, N.J. This latter material has a density of about 1.22 g/cc, a Shore A hardness of about 85 (ASTM D2240), an ultimate tensile strength of about 34 MPa (4930 psi) (ASTM D412), a yield strength at 300% elongation of about 14 MPa (2030 psi), a yield strength at 100% elongation of about 6.9 MPa (1000 psi), an elongation at break of about 690%, a tear strength of about 110 kN/m (628 pli) (ASTM D624), a Taber Abrasion of about 25 mg/1000 cycles (H-18 wheel; ASTM D-1044) and a Tensile Set of about 35% (at break by ASTM D-412).

Figure 3:
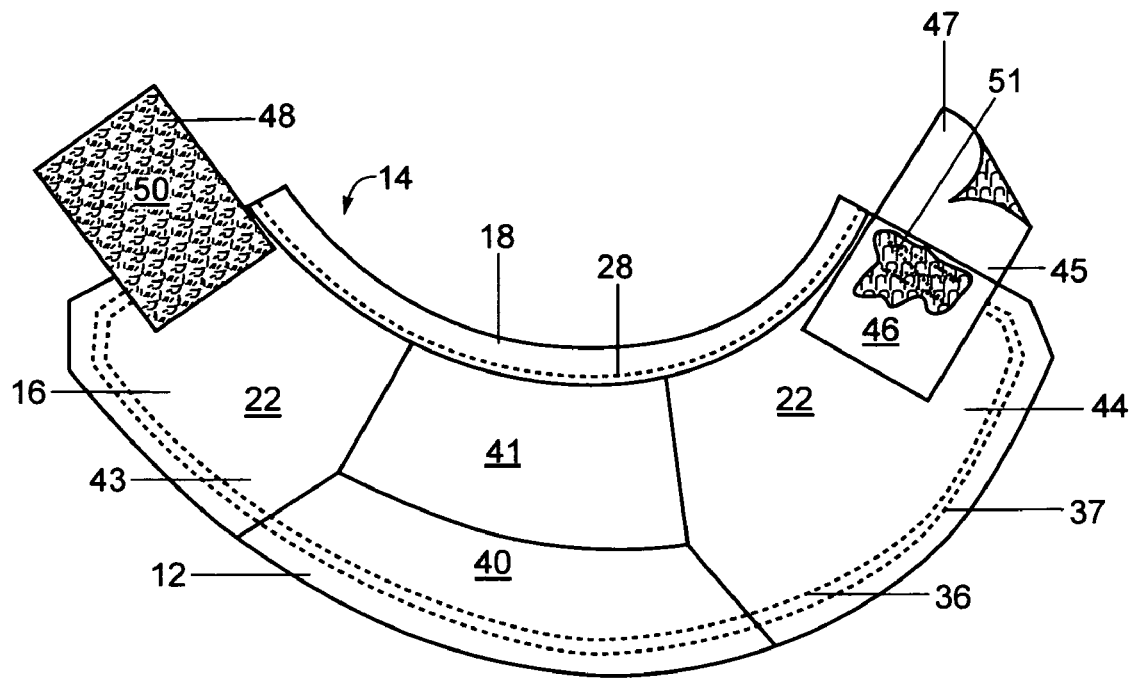
FIG. 3 is a plan view of the preferred boot shown in FIG. 2 when it is off of the horse and laid out flat.
Figure 4:
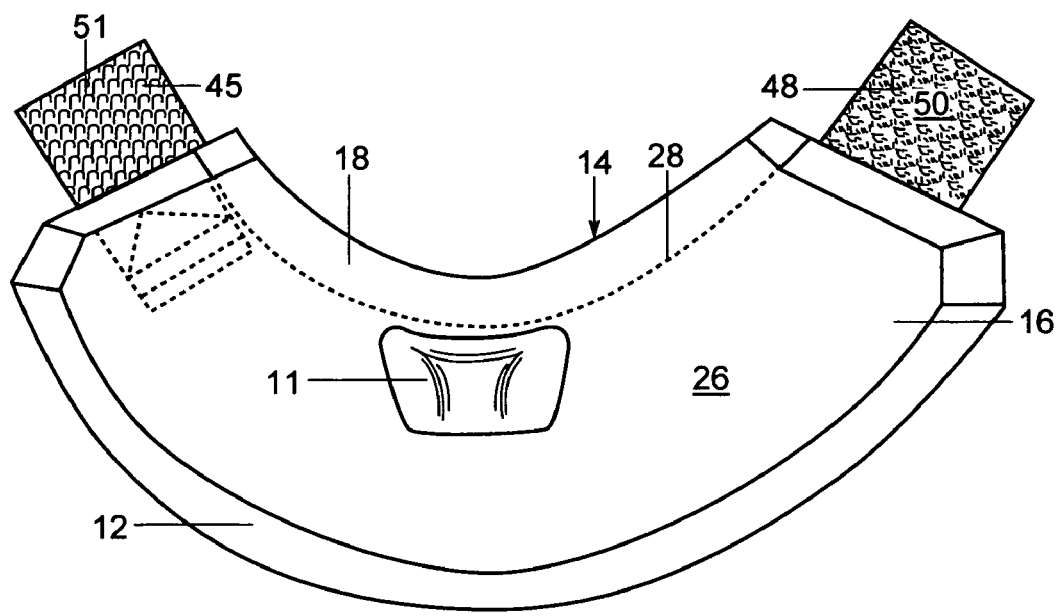
FIG. 4 is a bottom view of the preferred boot shown laid out flat in FIG. 3.

FIGS. 3-4 show other features of the boots of the present invention and the most typical boot shown in FIG. 2. FIG. 3 shows the exterior of the boot 14. An optional outer covering 22 of the bell portion 16 can be used to cover the exterior surface of the tough, relatively flexible material layer or hard shell 23. This optional covering 22 can be a film or fabric, such as a woven fabric like 2520 denier Oxford Nylon having two coats of polyurethane on one face, the hidden face (see FIG. 5), but many different materials can be used. The purpose of the polyurethane coating on the back of the Oxford Nylon outer covering 22 is to provide a water barrier and to provide some stiffness to the material. The optional outer covering 22 can end at the bottom edge of the hard shell 23 or can wrap under the bottom edge of the hard shell 23 and extend up about 4-13 mm on the inside of the hard shell 23 if desired. When used, the outer material should be flexible, strong and preferably water resistant. Other suitable materials for the outer covering 22 would include any material now used for the covering of horse boots such as leather, woven synthetics including 18 oz. woven polyester, polyethylene, polypropylene, polyurethane, tarp canvas, leather, rubber, etc.

Most typically, the exterior surface of the bell 16 of the boot 14 is the exterior surface of the tough, relatively flexible layer or hard shell 23, but it can also be silk screened to form a decorative pattern thereon. Also, the tough, relatively flexible layer or hard shell 23 can be colored on the surface or throughout the material of the hard shell 23 to present a colorful boot, either alone, or in combination with a pattern on the surface such as a silk screened pattern. The hard shell 23 can be of uniform thickness of about 3 mm to about 8-10 mm, but most typically is thicker in the rear portion 40 of the boot 14 than in other portions (see FIG. 5). For example, the thickness of the hard shell 23 is most typically about 4.5+/−1.5 mm in the lower rear portion 40 of the hard shell where the rear hoof is most likely to strike the boot 14 and tapering to about 2.1+/−

0.75 mm at the lower edge of the lower rear portion 40 of the hard shell 23 and tapering to about 1.5+/−0.65 mm in the upper rear portion 41 and the side portions 43,44 of the hard shell 23. The lower rear portion 40 of the hard shell 23 is most typically thicker by about 1 mm to about 10-11 mm than the thinner portions of the hard shell 23 in the upper rear portion 41 and the side portions 43,44.

A cushion layer 38 is next to and most typically adhered to the interior surface of the hard shell 23, the cushion layer 38 being typically about a 6 mm thick layer of EPD foam or EPT polyethylene butyl foam having a compression deflection of about 4-7 and a density of about 5-8 pounds per cubic foot. Other kinds of foam or cushiony material will work and should have the characteristic of not getting hard or changing compressibility materially when the ambient temperature falls below zero. A protrusion 7 is formed in the interior of the bell portion 16 on the back inside of the boot 14 by placing an appropriately shaped piece of foam rubber 11 known for this purpose next to the foam layer 38 in the appropriate place prior to applying an interior covering 26 in the known manner. The protrusion 7 has a shape and is located to fit into the bulb of the hoof when the boot 14 is secured in place on the horse to aid in preventing the boot from turning on the horse's hoof 5. Most typically the interior covering 26 is a laminate of PK cloth adhered to a 1.6-2 mm layer of NL W3 Neoprene 25 that is adhered to a layer of Jersey fabric 27, usually black. The Jersey knitted fabric can be a Jersey nylon of about 80 denier and knitted to have a 4-way stretch. The optional top cuff 18 is made by placing a foam strip 17 at the top edge of the hard shell 23, covering this foam strip 17 with the interior covering 26 and stitching the laminate together with one or two rows of stitches 28 (see FIG. 5).

An optional bottom cuff 12 is formed by rolling a strip of very strong fabric, usually a woven fabric like 2420 ballistic nylons or equivalent material, under the bottom edge of the hard shell 23, the cushion layer 38, the exterior cover 22 if used and the interior covering 26 and securing with a fastening means including rivets, adhesive and stitching one or more rows of stitches like 36 and 37, or equivalents thereof. A preferred thread for using in all of the stitching in the boots of the invention is a nylon 2520D thread, but a 138 polyester thread can also be used or other threads conventionally used to make equine boots. All stitches used in the boot 14 can be of various sizes and types normally used, but a straight stitch is preferred with about 6 stitches per inch being the most preferred.

The combination of the foam layer 38 and the stretchable interior covering 26 permits the horse to freely move the pastern and hoof freely without hindrance from the no-turn boot 14. If the interior covering 26 is not held taught during sewing the various stitches to fabricate the boot 14, several pleats may form on the inside of the cuff 18 during fabrication since the inside circumference of the cuff is shorter than the outside circumference of the cuff 18. These pleats, although not desired and can be avoided by holding the interior fabric taught during sewing, nevertheless are slight and soft and do not significantly affect the fit or the comfort of the boot 14.

Figure 6:
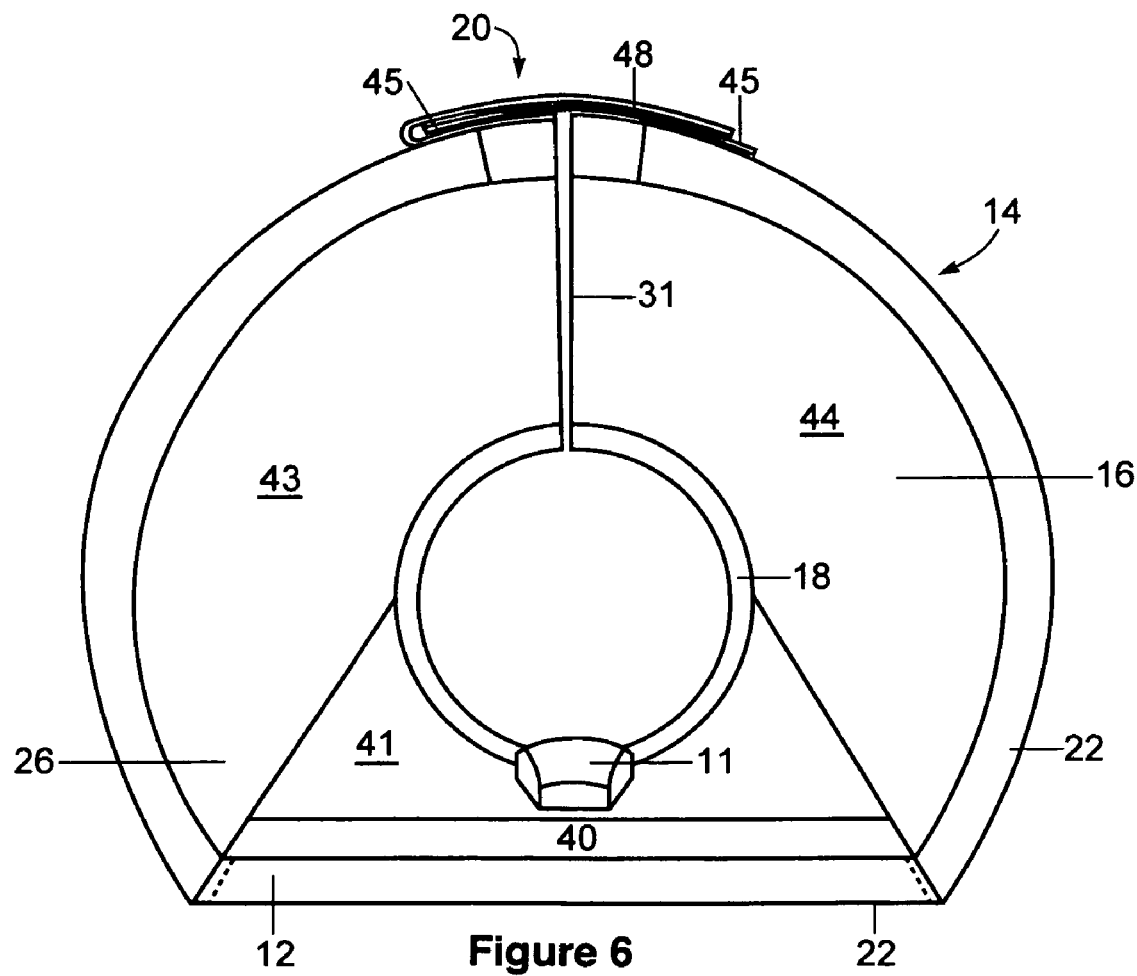
FIG. 6 is a bottom view of the preferred boot of the present invention when the boot is fastened onto the horses hoof.

The preferred boot 14 is constructed so that an opening or joint 31 between the two ends of the boot 14, when the boot 14 is secured on the horse, is located at or near the center of the front of the hoof, as shown in FIGS. 2 and 6. The boots of the present invention could be constructed so that the joint 31 would be in other locations, such as on the outer side of the hoof, but these embodiments are less desirable. The preferred location of the joint 31, as shown in FIG. 2 makes it easy to install the boots 14, provides for better protection of the horses front lower legs and improves the effectiveness of the fastener.

The fastener 20 can be of any known type that is flexible, such as Velcro® fasteners of known designs, buckles of various types used to secure boots and shoes, cleats and laces, belt and buckles of most types including, snaps, hooks and eyes etc., and is preferably attached only to the bell portion 16 of the boot 14. In the most typical boot 14 the fastener 20 is preferably a Velcro® type fastener. The preferred Velcro® type fastener 20 is of the same type as shown on the prior, art boot disclosed in U.S. Pat. No. 6,662,537. The fastener comprises a first flap 48 that is preferably covered with Velcro® hooks 50 on both front and back surfaces. The first flap 48 is sewn onto the outside of the boot 14 near one end of the boot 14 so that about 1-2 inches of the first flap 48 extends beyond the end of the boot 14 when the boot 14 is open, see FIG. 3. The first flap 48 is sewn to the bell portion of the boot 14 over a length preferably of at least ½-¾ of an inch using several stitches as shown.

The preferred fastener further comprises a second, and longer, flap 45 preferably having Velcro® loops 51 covering all or most of one face, the face that is hidden when the boot 14 is secured on the horse. The face having the Velcro® loops has an attached portion 46 and an unattached portion 47 (See FIG. 3). The length of the attached portion 46 should be the same or almost the same as the length of the unattached portion of the first flap 48 because one face of the first flap 48 attaches to the attached portion 46 of the second flap 45. This also allows the boot to fit slightly different sized hooves. The boots 14 can be made in various sizes to fit different sized hooves, but some adjustment in size can also be made with the fastener. The attached portion 46 of the second flap 45 is preferably sewn to the exterior of the bell portion 16 of the boot 14 to align with the first flap 48 when the boot is in a closed position. Several stitches are used to attach the attached portion 46 of the second flap 45 as shown in FIGS. 3 and 4.

The boots of the present invention can be made in many sizes, but typically are made in several sizes including small, medium, large and extra large. The fabrics and materials used to make the boots can be in any of many colors, but preferably all surfaces showing are black, charcoal, or dark gray. The color is a matter of choice.

Only the preferred embodiments of the present invention have been described in detail above. It will be obvious to the ordinary artisan, having the benefit of the above disclosure, that many other embodiments within the broad description of the invention are possible. Such embodiments are intended to be included within the scope of one or more of the following claims.

The invention claimed is:

1. A laminate comprising a relatively rigid, molded layer of a hard, tough and somewhat flexible material selected from a group consisting of polyurethanes, polyester type polyurethanes, epoxies, fluoropolymers, polyamides, polycarbonates, polyesters, polyethylene, polyolefins, polypropylene, polyvinyl chlorides, silicones, styrene acrylonitriles, other thermoplastic elastomers, and organic materials including rubber and leathers including cowhide and leathers having similar properties, attached to a cushion layer, the hard, tough and flexible layer having a Shore A hardness in the range of about 80 to about 93, a tear strength of at least about 50 N/mm, and the thickness of the hard, tough and flexible layer being at least 1.5+/−0.65 mm and varying in thickness in an amount in the range of about plus 1 mm to about plus 11 mm, the cushion layer comprising a layer of compressible foamed material and a layer of soft fabric.

2. The laminate of claim 1 wherein the layer of tough, flexible and hard material is a polyester type polyurethane having a Shore A hardness of about 85+/−5, a density in the range of about 1.22 to about 1.24 g/cubic mm, and an elongation at break of at least about 600 percent.

3. The laminate of claim 2 wherein the laminate further comprises a layer of film or dense fabric on an exposed surface opposite the soft fabric layer.

4. The laminate of claim 2 wherein the tear strength of the tough, flexible and hard material is at least about 70 N/mm.

5. The laminate of claim 2 wherein the Shore hardness of the tough, flexible and hard material is in the range of about 80 to about 90.

6. The laminate of claim 2 wherein the tough, flexible and hard material has a Shore hardness of about 85+/−4 and the tear strength is at least about 60 N/mm.

7. The laminate of claim 1 wherein the laminate further comprises a layer of film or dense fabric on an exposed surface opposite the soft fabric layer.

8. The laminate of claim 7 wherein the tear strength of the tough, flexible and hard material is at least about 70 N/mm.

9. The laminate of claim 7 wherein the Shore hardness of the tough, flexible and hard material is in the range of about 80 to about 90.

10. The laminate of claim 7 wherein the tough, flexible and hard material has a Shore hardness of about 85+/−4 and the tear strength is at least about 60 N/mm.

11. The laminate of claim 1 wherein the tear strength of the tough, flexible and hard material is at least about 70 N/mm.

12. The laminate of claim 1 wherein the Shore hardness of the tough, flexible and hard material is in the range of about 80 to about 90.

13. The laminate of claim 1 wherein the tough, flexible and hard material has a Shore hardness of about 85+/−4 and the tear strength is at least about 60 N/mm.

14. A method of making a laminate comprising attaching a relatively rigid, molded layer of a hard, tough and somewhat flexible material selected from a group consisting of polyurethanes, polyester type polyurethanes, epoxies, fluoropolymers, polyamides, polycarbonates, polyesters, polyethylene, polyolefins, polypropylene, polyvinyl chlorides, silicones, styrene acrylonitriles, other thermoplastic elastomers, and organic materials including rubber and leathers including cowhide and leathers having similar properties, to a cushion layer, the hard, tough and flexible layer having a Shore A hardness in the range of about 80 to about 93, a tear strength of at least about 50 N/mm, and a thickness of at least 1.5+/−0.65 mm and varying in thickness in an amount in the range of about plus 1 to about plus 11 mm, the cushion layer comprising a layer of a compressible foamed material.

15. The method of claim 14 wherein the layers are attached using an adhesive, stitching or both.

16. The method of claim 15 further comprising the step of attaching a layer of soft fabric to the exposed surface of the foamed material.

17. The method of claim 14 further comprising the step of attaching a layer of soft fabric to the exposed surface of the foamed material.

18. The method of claim 14 wherein the tear strength of the tough, flexible and hard material is at least about 70 N/mm.

19. The method of claim 14 wherein the Shore hardness of the tough, flexible and hard material is in the range of about 80 to about 90.

20. The method of claim 14 wherein the tough, flexible and hard material has a Shore hardness of about 85+/−4 and the tear strength is at least about 60 N/mm.

* * * * *